United States Patent
Boydstun et al.

(10) Patent No.: US 7,496,762 B1
(45) Date of Patent: Feb. 24, 2009

(54) SECURITY ARCHITECTURE FOR MODIFIED SEGREGATED ENVIRONMENT FOR FEDERAL TELECOM SERVICES

(75) Inventors: Kenneth C. Boydstun, Frisco, TX (US); Paul H. Park, Flower Mound, TX (US); Kenneth Thomas Hudok, Jr., Overland Park, KS (US); Tammy Lynn Etienne, Centreville, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 903 days.

(21) Appl. No.: 10/960,536

(22) Filed: Oct. 7, 2004

(51) Int. Cl.
   *H04L 9/32* (2006.01)
(52) U.S. Cl. .......................... 713/182; 705/26
(58) Field of Classification Search ................. 713/200
   See application file for complete search history.

(56) References Cited

U.S. PATENT DOCUMENTS

| | | | | |
|---|---|---|---|---|
| 5,829,003 A | * | 10/1998 | Okura | 707/100 |
| 6,112,188 A | * | 8/2000 | Hartnett | 705/36 R |
| 6,375,466 B1 | * | 4/2002 | Juranovic | 434/107 |
| 7,069,447 B1 | * | 6/2006 | Corder | 713/189 |
| 2003/0021417 A1 | * | 1/2003 | Vasic et al. | 380/277 |
| 2004/0181461 A1 | * | 9/2004 | Raiyani et al. | 705/26 |
| 2006/0271563 A1 | * | 11/2006 | Angelo et al. | 707/100 |

* cited by examiner

*Primary Examiner*—Kambiz Zand
*Assistant Examiner*—Dant B Shaifer Harriman

(57) ABSTRACT

A security architecture for telecommunications services is provided that includes a first and second user interfaces, a first and second web servers, a service broker, application servers, and data stores. The first user interface is for enterprise users to access an enterprise. The first web server communicates with the first user interface. The application servers run enterprise applications which communicate with the data stores. A customer data is stored on a first portion of one of the data stores and a government data is stored on a second portion. The second user interface is for access to an enterprise by government users. The second web server communicates with the second user interface. The service broker receives requests from the second web server related to the government data and authorizes the enterprise applications to access the government data stored on the second portion of one of the data stores.

21 Claims, 2 Drawing Sheets

SECURITY ARCHITECTURE FOR MODIFIED SEGREGATED ENVIRONMENT FOR FEDERAL TELECOM SERVICES

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to secure storage and processing of data within a computing system. More particularly, embodiments of the present invention provide a security architecture for modified segregated environment for federal telecommunications services.

BACKGROUND OF THE INVENTION

An enterprise providing a service to a client might have a computing system that stores and processes client-related data. The enterprise would typically implement well-known security measures such as authentication and authorization to prevent unauthorized parties from gaining access to the data. Some clients might require that their data receive a higher level of security than what the enterprise typically provides. Some government agencies, in particular, tend to demand that a stringent set of security policies be enforced on their data.

Among the security measures a government agency might require are encryption of data, computer-generated alphanumeric passwords that must be changed frequently, logging of all transactions that might impact the government agency data, and the isolation of government agency data from the data pertaining to other clients of the enterprise. One solution that has been employed to meet the data isolation requirement is the creation of a duplicate computing system that is completely separate, both physically and logically, from the computing system that is used to store and process other clients' data. Databases, applications, application servers, and other components of the enterprise's computing architecture are reproduced in a physically isolated computing system accessible only to the enterprise and the government agency. Physical separation such as this prevents another client from accessing government agency data via the enterprise's standard computing system. Isolation also allows the enforcement of the government agency's stricter security policies without the need for modifying the enterprise's standard security policies.

While the duplication of an existing computing system can provide the level of security a government agency might require, this is a highly inefficient and costly solution. The expense of purchasing and operating two systems to perform similar functions can negate the financial benefit that might be gained from providing services to the government agency.

SUMMARY OF THE INVENTION

One embodiment provides a security architecture for telecommunications services including a first and second user interfaces, a first and second web servers, a service broker, a plurality of application servers, and a plurality of data stores. The first user interface is for enterprise users to access an enterprise. The first web server communicates with the first user interface. The plurality of application servers run one or more enterprise applications. The plurality of data stores communicate with the enterprise applications. A customer data is stored on a first portion of one or more of the plurality of data stores and a government data is stored on a second portion of the one or more of the plurality of data stores. The second user interface is for access to an enterprise by government users. The second web server communicates with the second user interface. The service broker receives requests from the second web server related to the government data and authorizes at least one of the enterprise applications to access the government data stored on the second portion of the one or more of the plurality of data stores.

An alternative embodiment provides a method of securing federal telecommunications services. The method includes accessing an enterprise via a government provided user interface, and accessing, via the government provided user interface, a dedicated enterprise web server. The method includes managing transactions related to the government data using a dedicated service broker. The method includes authorizing, by the service broker, enterprise applications to execute transactions of involving government data. The method also provides for storing at least a portion of the government data in an enterprise data store having a separate partition for the government data. At least a portion of the communication between the enterprise application and the enterprise data store is accomplished via a secure communication line.

These and other features and advantages will be more clearly understood from the following detailed description taken in conjunction with the accompanying drawings and claims.

BRIEF DESCRIPTION OF THE DRAWINGS

For a more complete understanding of the presentation and the advantages thereof, reference is now made to the following brief description, taken in connection with the accompanying drawings in detailed description, wherein like reference numerals represent like parts.

DETAILED DESCRIPTION OF THE PREFERRED EMBODIMENTS

It should be understood at the outset that although an exemplary implementation of one embodiment is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

In various embodiments, systems and methods are provided that allow an enterprise to store and process data for a client with stringent data security requirements on the same computing equipment that is used to store and process data for clients with less strict security policies. For ease of reference, the client with stringent data security requirements will be referred to herein as a government agency and the client's data will be referred to as government data, but it should be understood that the client is not necessarily a governmental entity or agency and may be any customer desirous of implementing a heightened level of security.

In an embodiment, government data physically resides in databases or other storage media in the enterprise's computing system, but is in partitions that are logically separate from the data of other clients. When data is entered into the enterprise's computing system, the data is linked to account information that is flagged to indicate if it is government data or data pertaining to another client. The identifier identifying the government data may include a unique field, or element of data. If it is government data, it is sent to the separate logical database where only government data resides. When data is retrieved from the enterprise's computing system, security measures ensure that only the government agency can gain access to the separate logical database.

In an embodiment, all security, logging, auditing, and reporting functions for the government data are centralized in a single component that can be referred to as a service broker. The service broker acts as a proxy so that when the government agency wants to access its data, the service broker works on behalf of the government agency to allow access. With all transactions involving government data being secured and logged by the service broker, security is added at multiple locations in the computing system with the addition of the service broker in only one location. This allows the enterprise to enforce a higher level of security for some transactions without altering its existing computing system architecture.

Figure 1:
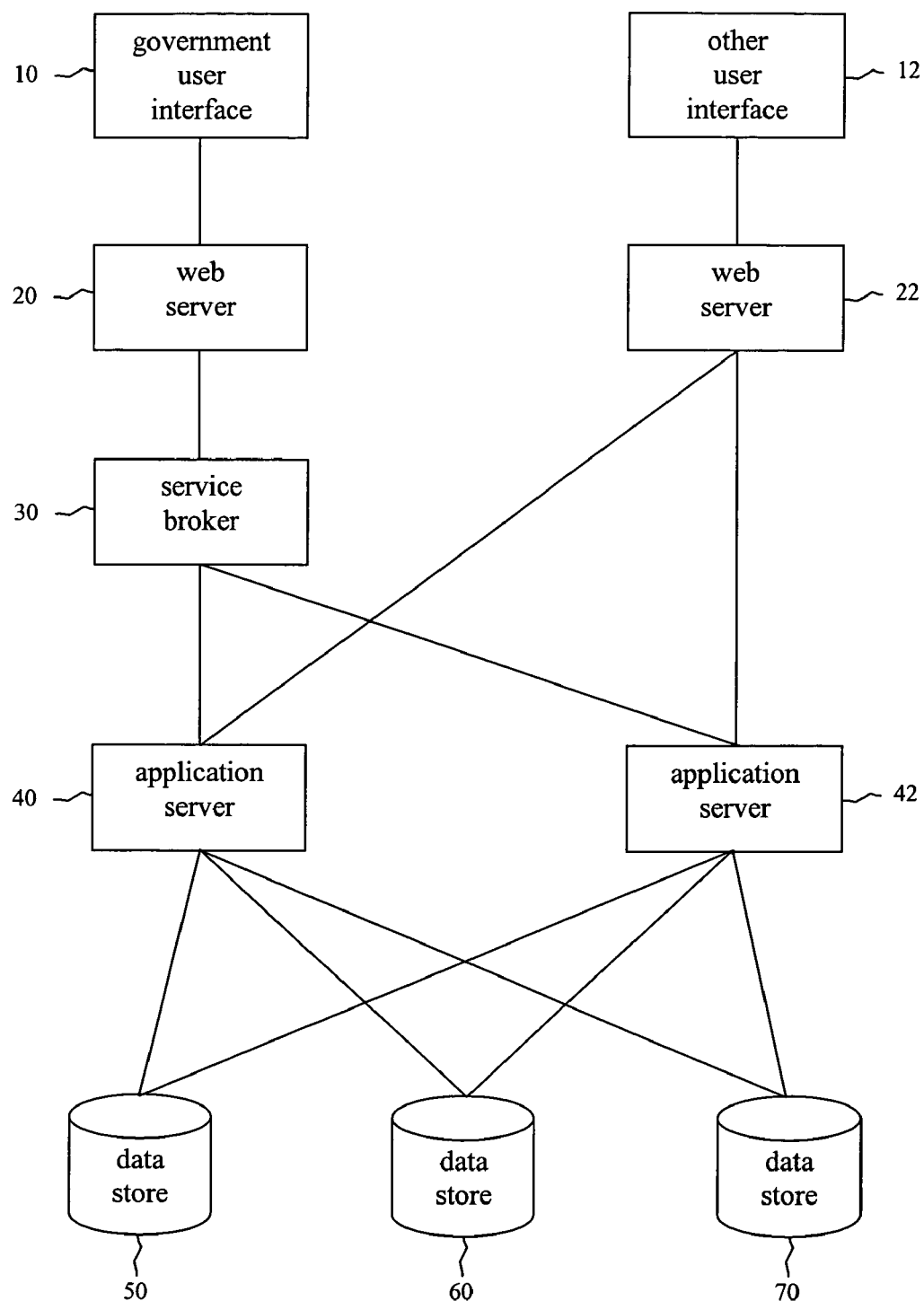
FIG. 1 is a block diagram of an embodiment of a security system.

FIG. 1 illustrates an embodiment of a computing system that uses a service broker to provide data security. A government agency has its own user interface 10 which is separate from the user interface 12 used by all other clients. In the embodiment of FIG. 1, the government user interface 10 accesses a web server 20 that is separate from a web server 22 that is accessed by the interface 12 used by other users. In the present embodiment, the web server 20 may be dedicated for use via the government user interface 10. In an alternative embodiment, both interfaces 10 and 12 access a single web server.

The government web server 20 provides access to the service broker 30. In the preferred embodiment, the security measures that control access to the service broker 30 via the government user interface 10 and the government web server 20 are the standard login procedures already in use by the government agency for secure access to its own computing systems. These security measures may include, for example, standard user name and password authentication and authorization.

Once the government agency has gained access to the service broker 30, the service broker 30 can allow secure access to the enterprise's back end data processing and data storage systems. These systems are depicted in FIG. 1 as application servers 40 and 42 and data stores 50, 60, and 70, but other numbers and types of computing system components could be present. The application servers 40 and 42 and data stores 50, 60, and 70 that are accessible through the service broker 30 may be the same application servers 40 and 42 and physical data stores 50, 60, and 70 that other users can reach via the other interface 12 and web server 22.

In one embodiment, each physical data store 50, 60, and 70 contains a logical partition that can be accessed only through the service broker 30. When government data is placed in one of these partitions, only the government agency can access the data using the services of the service broker 30. Data going into or coming out of one of these data store partitions can be flagged to indicate that the data should be processed differently from the data of other clients. In the preferred embodiment, every message or request initiating from, and/or directed or related to the government user interface 10 funneled through the service broker 30 for more complete monitoring and management of government data.

In other embodiments, data passing through the service broker 30 may be encrypted, by the service broker 30 or otherwise, and communicated and stored in an encrypted state. For additional security, the data may be both encrypted and stored on partitioned storage devices accessible only from the service broker 30.

In one embodiment, the application servers 40 and 42 have the ability to determine if a data request is coming from the service broker 30 or from the web server 22 that is accessible to other clients. If a request comes from the web server 22, it is processed in a normal manner. All requests coming from the service broker 30 are logged and subjected to stricter security measures, such as encryption of data and communications between enterprise applications, components or systems.

In one embodiment, a virtual private network (VPN) is created between the service broker 30, the application servers 40 and 42, and the government data partitions of the data stores 50, 60, and 70. When requests from the government user interface 10 gains access to the service broker 30, at least a portion of the communication may be provided via the VPN. By providing point-to-point authentication and authorization at the transport layer, the VPN gives the government agency communications exclusive access to its partitions in the data stores 50, 60, and 70. Further, the VPN may be static or always in place, or dynamically created. For example, the service broker 30 may direct a dedicated communication channel between the service broker 30 and application server 40 or data store 50. The system may dynamically create or allocate VPN resources for this communication. In other embodiments, dedicated communication lines or facilities may be employed instead of, or in conjunction with, VPNs.

In another embodiment, each communication between the application server 40 or 42 and the government data partition of the data store 50, 60, or 70 is managed by the service broker 30. In some embodiments, the service broker 30 informs the application server 40 or 42 whether the application server 40 or 42 is authorized to fill the request. In other embodiments, the application servers 40 or 42 request authorization from service broker 30 in order to perform any action on government data. For example, the application server 40 or 42 seeks authorization from the service broker 30 for each transaction. In another instance, the application server 40 or 42 obtains a one-time token from the service broker 30 and thereafter uses the token to authenticate itself to a government data partition of the data store 50, 60, or 70. Other techniques employed by the service broker 30 to authorize and authenticate systems working with government data will readily suggest themselves to one skilled in the art.

In any of the above embodiments, the service broker 30 restricts access to the government data partitions of the data stores 50, 60, and 70 to only authenticated and authorized users that have reached the service broker 30 through the government user interface 10 and the web server 20. This can fulfill the requirement that government data be kept logically separate from other data. By logging all transactions involving government data, the service broker 30 can centralize the functions in relation to logging, auditing, and reporting that a government agency might demand. It is readily apparent that the location of the service broker 30 provides for tracking every aspect of the government data with minimal modifications to the enterprise, while providing access to the enterprise resources. In some embodiments, the service broker 30 may communicate directly or through a data layer (not shown) with the data stores 50, 60, and 70, via a communication line (not shown), to more directly manage the government data for additional security.

Figure 2:
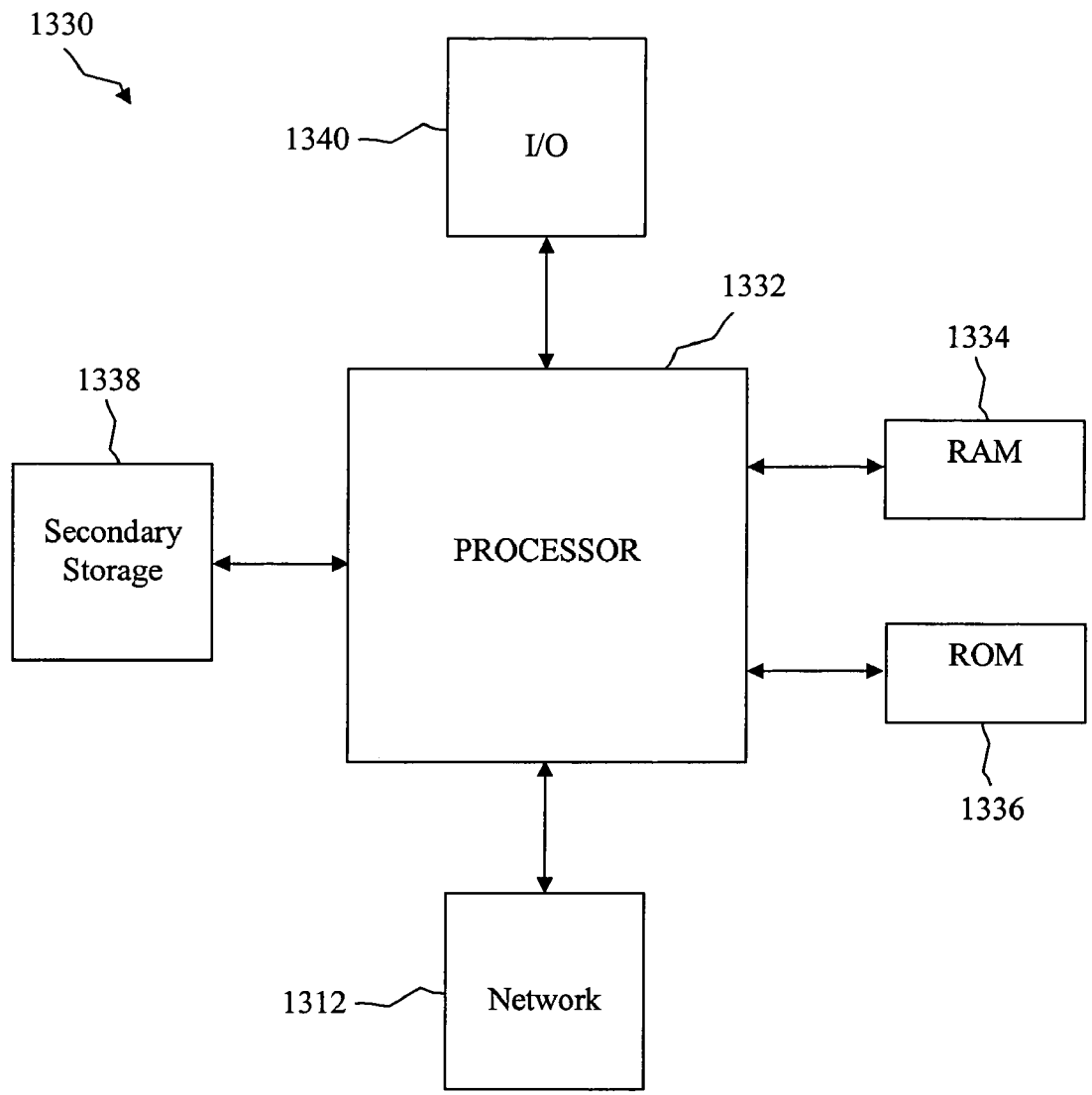
FIG. 2 is a block diagram of a computing system.

The system described above may be implemented on any general-purpose computer with sufficient processing power, memory resources, and network throughput capability to handle the necessary workload placed upon it. FIG. 2 illustrates a typical, general-purpose computer system suitable for implementing one or more embodiments disclosed herein. The computer system 1300 includes a processor 1332 (which may be referred to as a central processor unit or CPU) that is in communication with memory devices including secondary storage 1338, read only memory (ROM) 1336, random access memory (RAM) 1334, input/output (I/O) 1340 devices, and network connectivity devices 1312. The processor 1332 may be implemented as one or more CPU chips.

The secondary storage 1338 is typically comprised of one or more disk drives or tape drives and is used for non-volatile storage of data and as an over-flow data storage device if RAM 1334 is not large enough to hold all working data. Secondary storage 1338 may be used to store programs that are loaded into RAM 1334 when such programs are selected for execution. The ROM 1336 is used to store instructions and perhaps data that are read during program execution. ROM 1336 is a non-volatile memory device that typically has a small memory capacity relative to the larger memory capacity of secondary storage. The RAM 1334 is used to store volatile data and perhaps to store instructions. Access to both ROM 1336 and RAM 1334 is typically faster than to secondary storage 1338.

I/O devices 1340 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 1312 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as Global System for Mobile Communications (GSM) radio transceiver cards, and other well-known network devices. These network connectivity devices 1312 may enable the processor 1332 to communicate with the Internet or one or more intranets. With such a network connection, it is contemplated that the processor 1332 might receive information from the network, or might output information to the network in the course of performing the above-described method steps. Such information, which is often represented as a sequence of instructions to be executed using processor 1332, may be received from and outputted to the network, for example, in the form of a computer data signal embodied in a carrier wave.

Such information, which may include data or instructions to be executed using processor 1332 for example, may be received from and outputted to the network, for example, in the form of a computer data baseband signal or signal embodied in a carrier wave. The baseband signal or signal embodied in the carrier wave generated by the network connectivity devices 1312 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 1332 executes instructions, codes, computer programs, scripts which it accesses from hard disk, floppy disk, optical disk (these various disk based systems may all be considered secondary storage 1338), ROM 1336, RAM 1334, or the network connectivity devices 1312.

While several embodiments have been provided in the present disclosure, it should be understood that the Security Architecture For Modified Segregated Environment For Federal Telecom Services may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A security architecture for telecommunications services, comprising:
    at least one processor;
    a first user interface stored on a computer readable medium and configured to execute on the at least one processor, the first user interface provides enterprise users access to an enterprise;
    a first web server stored on a computer readable medium and configured to execute on the at least one processor, the first web server communicates with the first user interface;
    a plurality of application servers stored on a computer readable medium and configured to execute on the at least one processor, the plurality of web servers run one or more enterprise applications of the enterprise;
    a plurality of data stores of the enterprise in communication with the enterprise applications, a customer data stored on a first portion of one or more of the plurality of data stores and a government data stored on a second portion of the one or more of the plurality of data stores;
    a second user interface stored on a computer readable medium and configured to execute on the at least one processor, the second user interface provides access to the enterprise by government users;
    a second web server stored on a computer readable medium and configured to execute on the at least one processor, the second web server communicates with the second user interface; and
    a service broker stored on a computer readable medium and configured to execute on the at least one processor, the service broker provides a higher level of security by receiving requests only from the second web server related to the government data and authorizing at least one of the enterprise applications to access the government data stored on the second portion of the one or more of the plurality of data stores.

2. The security architecture of claim 1, wherein first and second portions of the one or more of the plurality data stores is further defined as a first and second partitions of one or more of the plurality of data stores.

3. The security architecture of claim 1, wherein the first portion of the one or more of the plurality data stores is further the defined as a first partition for storing the customer data, and wherein the second portion of the one or more of the plurality data stores is further the defined as a second partition for storing the government data.

4. The security architecture of claim 3, wherein at least a portion of the government data stored in the second partition is encrypted.

5. The security architecture of claim 3, wherein the government data stored in the second partition is accessible only by the service broker.

6. The security architecture of claim 3, wherein the government data stored in the second partition is accessible only by authorization of the service broker.

7. The security architecture of claim 6, wherein the service broker authorizes one or more of the enterprise applications to access the second partition containing the government data.

8. The security architecture of claim 7, wherein the service broker authorizes one or more of the enterprise applications to access the second partition using a token.

9. The security architecture of claim 6, wherein the one or more enterprise applications notify the service broker of transactions involving the government data.

10. The security architecture of claim 6, wherein the one or more enterprise applications notify the service broker of only transactions involving the government data.

11. The security architecture of claim 6, wherein the service broker monitors transactions involving the government data.

12. The security architecture of claim 1, further comprising a first security component to authorize use by enterprise users of the first user interface; and
a second security component to authorize use by government users of the second user interface, the first security component different than the second security component.

13. The security architecture of claim 1, wherein the service broker logs each transaction involving the government data.

14. The security architecture of claim 13, wherein the log includes an identifier of the enterprise component involved, an identifier of the data involved, and a transaction information.

15. A method of securing federal telecommunications services, comprising:
accessing an enterprise via a government provided user interface;
accessing, via the government provided user interface, a dedicated enterprise web server;
managing transactions related to the government data using a dedicated service broker;
authorizing, by the service broker, enterprise applications to execute transactions related to government data; and
storing at least a portion of the government data in an enterprise data store having a separate partition for the government data, at least a portion of the communication between the enterprise application and the enterprise data store via a secure communication line,
wherein the enterprise applications are accessible by the government users via the government user interface and enterprise users via another user interface, and
wherein the dedicated service broker is only accessed via the government user interface through the dedicated enterprise web server.

16. The method of claim 15, wherein the secure communication line is further defined as a virtual private network.

17. The method of claim 15, wherein the service broker logs only transaction related to the government data.

18. A security architecture for telecommunications services, comprising:
at least one processor;
a first user interface stored on a computer readable medium and configured to execute on the at least one processor, the first user interface provides enterprise users access to an enterprise;
a first web server stored on a computer readable medium and configured to execute on the at least one processor, the first web server communicates with the first user interface;
a plurality of application servers stored on a computer readable medium and configured to execute on the at least one processor, the plurality of application servers run one or more enterprise applications of the enterprise;
a plurality of data stores of the enterprise in communication with the enterprise applications, a first customer data stored on a first partition of one or more of the plurality of data stores and a second customer data stored on a second partition of the one or more of the plurality of data stores, at least a portion of the second customer data stored on the second partition in an encrypted manner;
a second user interface stored on a computer readable medium and configured to execute on the at least one processor, the second user interface provides access to the enterprise by second customer users;
a second web server stored on a computer readable medium and configured to execute on the at least one processor, the second web server communicates with the second user interface; and
a service broker stored on a computer readable medium and configured to execute on the at least one processor, the service broker provides a higher level of security by receiving requests only from the second web server related to the second customer data and authorizing at least one of the enterprise applications to access the second customer data stored on the second portion of the one or more of the plurality of data stores.

19. The security architecture of claim 18, wherein the second customer data stored in the second partition is accessible only by the service broker.

20. The security architecture of claim 18, wherein the second customer data stored in the second partition is accessible only by authorization of the service broker.

21. The security architecture of claim 18, wherein the service broker authorizes one or more of the enterprise applications to access the second partition containing the second customer data.

* * * * *